US007857386B2

(12) United States Patent
Van der Vegt

(10) Patent No.: US 7,857,386 B2
(45) Date of Patent: Dec. 28, 2010

(54) CHILD SEAT

(75) Inventor: Herman Van der Vegt, Utrecht (NL)

(73) Assignee: Team-Tex S.A.S. (FR)

( * ) Notice: Subject to any disclaimer, the term of this patent is extended or adjusted under 35 U.S.C. 154(b) by 0 days.

(21) Appl. No.: 12/208,648

(22) Filed: Sep. 11, 2008

(65) Prior Publication Data

US 2009/0072600 A1    Mar. 19, 2009

(30) Foreign Application Priority Data

Sep. 13, 2007   (EP)   ................. 07116385

(51) Int. Cl.
*A47D 1/10*   (2006.01)
(52) U.S. Cl. .............................. 297/256.13; 297/256.1; 297/256.12
(58) Field of Classification Search ................ 297/410, 297/256.13, 256.1, 256.11, 250, 353
See application file for complete search history.

(56) References Cited

U.S. PATENT DOCUMENTS

| | | | | | |
|---|---|---|---|---|---|
| 4,033,622 | A | * | 7/1977 | Boudreau | 297/256.13 |
| 4,762,364 | A | * | 8/1988 | Young | 297/256.13 |
| 4,858,997 | A | * | 8/1989 | Shubin | 297/487 |
| 5,005,903 | A | * | 4/1991 | Minardi | 297/219.12 |
| 5,662,379 | A | * | 9/1997 | Zimelman | 297/256.15 |
| 5,733,003 | A | * | 3/1998 | Goor | 297/250.1 |
| 5,749,599 | A | * | 5/1998 | Gardner | 280/748 |
| 5,836,649 | A | * | 11/1998 | Bonetti | 297/256.1 |
| 6,302,482 | B1 | * | 10/2001 | Moll et al. | 297/340 |
| 6,739,661 | B1 | * | 5/2004 | Dukes | 297/256.13 |
| 6,746,080 | B2 | * | 6/2004 | Tsugimatsu et al. | 297/256.13 |
| 7,104,606 | B2 | * | 9/2006 | Congleton et al. | 297/353 |
| 2006/0170262 | A1 | * | 8/2006 | Gold et al. | 297/256.12 |

FOREIGN PATENT DOCUMENTS

| | | |
|---|---|---|
| DE | 3505010 A1 | 8/1986 |
| EP | 0947383 A1 | 10/1999 |
| EP | 1084900 A2 | 3/2001 |
| WO | 2004002773 A1 | 1/2004 |
| WO | 2005000627 A1 | 1/2005 |

OTHER PUBLICATIONS

European Search Report, EP07116385, May 7, 2008, 5 pages.

* cited by examiner

*Primary Examiner*—David Dunn
*Assistant Examiner*—Erika Garrett
(74) *Attorney, Agent, or Firm*—St. Onge Steward Johnston & Reens LLC

(57) ABSTRACT

A child seat for transporting a child in a car includes a seat support with a support bottom and a support back which extends above the support bottom, a seat frame that has harness belts for holding the child against the seat frame, and slides between the seat support and the seat frame for coupling the seat frame in adjustable tilt positions to the seat support, which slides include an upper slide for connecting the upper or shoulder part of the seat frame to the support back and a lower slide for connecting the lower or bottom part of the seat frame to the support bottom. In accordance with the invention on both sides of the seat frame the seat support includes a diagonal bar for connecting the forward part of the support bottom to the support back above or at the height of the upper slide.

8 Claims, 2 Drawing Sheets

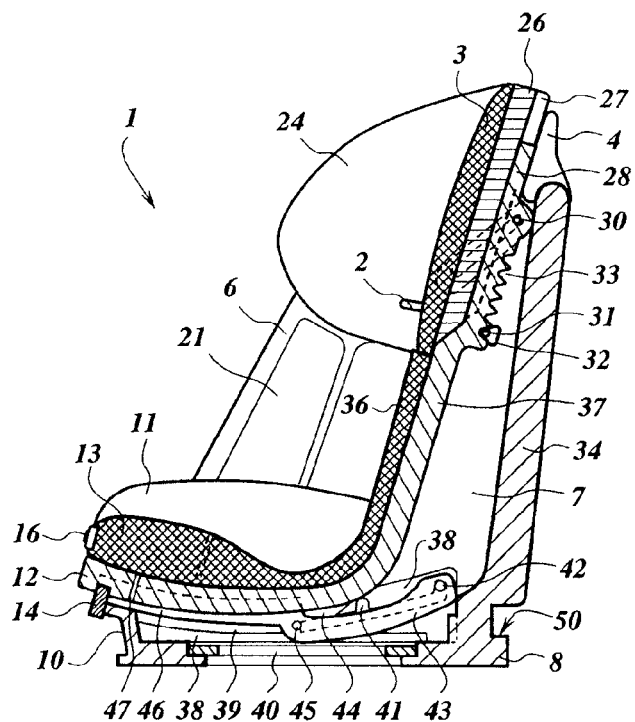
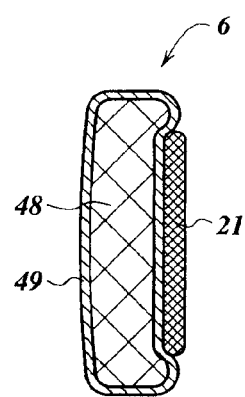
Fig. 5
Fig. 6
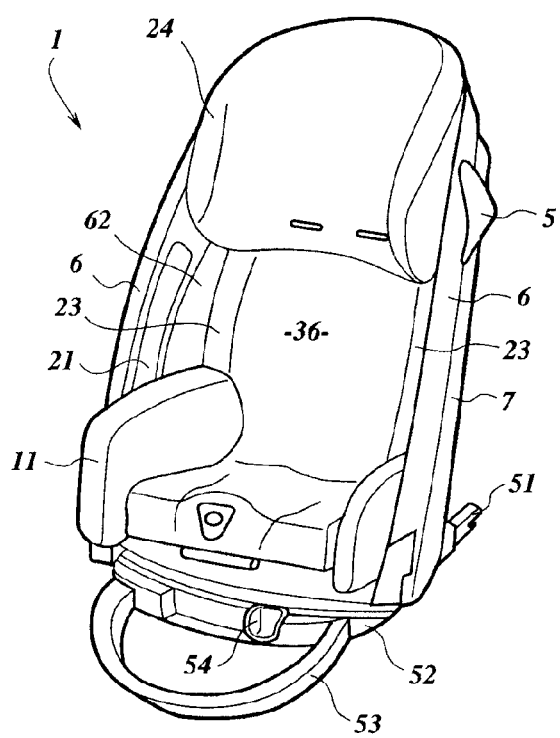
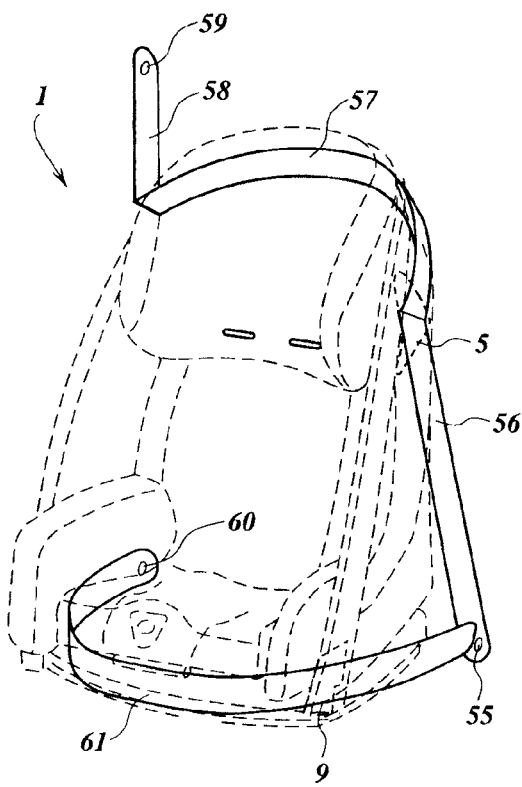
Fig. 7  Fig. 8

CHILD SEAT

CROSS-REFERENCE TO RELATED APPLICATIONS

The present application claims priority from European patent application no. 07116385.1, filed Sep. 13, 2007, the content of which is incorporated herein by reference.

FIELD OF THE INVENTION

The invention concerns a child seat for transporting a child in a car comprising a seat support with a support bottom and a support back which extends above the support bottom, a seat frame that has harness belts for holding the child against the seat frame, and slides between the seat support and the seat frame for coupling the seat frame in adjustable tilt positions to the seat support, which slides comprise an upper slide for connecting the upper or shoulder part of the seat frame to the support back and a lower slide for connecting the lower or bottom part of the seat frame to the support bottom.

BACKGROUND OF THE INVENTION

Such devices are known and document WO 2005/000627 shows such a device. In the known device during collision inertia forces on the child tension the belt and the upper slide pulls on the upper part of the support back. As the support back is made of plastic material that is flexible, the upper part will deform due to the forces and this will cause additional movement of the child under the inertia forces. The additional movement of the child causes the risk of injury to the child to increase and this must be avoided.

SUMMARY OF THE INVENTION

In order to avoid this risk, the child seat has on both sides of the seat frame (12) the seat support (7) comprising a diagonal bar (6) for connecting a forward part of support bottom (8) to the support back (34) above or at the height of the upper slide (29, 30). In this way, inertia forces on the child acting on the support back transfer directly and without deformation of the support to the support bottom and from there to the car. This means that the harness belts restrain the child better and that injury is prevented.

In accordance with an embodiment, the child seat comprises the diagonal bar (6) that has a tube shaped section that is rectangular with rounded or elliptical corners whereby the height is at least three times the width. In this way, the sideways protection and support of the child in the seat is considerable as the diagonal bars prevent parts of the car to contact the child.

In accordance with an embodiment, the child seat has tilt positions that range from an upright sitting position to a recline position and whereby the diagonal bars (6) are in all tilt positions in front of the upper or shoulder part (37) of the seat frame (12). In this way, the diagonal bar provides protection for the child even when the seat frame is in recline position.

In accordance with an embodiment, the child seat comprises the seat frame (12) that has between the diagonal bars (6) a height adjustable head support (3, 24, 26). The head support provides additional support and protection of the child's head, while the diagonal bars protect the head support and prevent its deformation in a collision.

In accordance with an embodiment, the child seat comprises the support bottom (8) which has first attachment means (40) for removably connecting the support bottom to a base (52) fastened on the seat of the car. In this way, it is easy to place and fix the child seat on the base in the car or to remove it from the car by gripping the diagonal bars.

In accordance with an embodiment, the child seat comprises the seat support (7) which has second attachment means (4, 5, 9, 10) for guiding and attaching a shoulder belt (56, 57, 58) and a hip belt (61) of the car to respectively the support back (34) and the support bottom (8). In this way, it is easy to fix the child seat in the car, while the diagonal bars prevent that the forces on the shoulder and/or hip belt deform the support and so prevent additional movement of the child in a collision.

In accordance with an embodiment, the child seat includes the harness belts that comprise a shoulder belt (22) that is guided through an opening (2) in the height adjustable head support (3, 4, 26). In this way, the height adjustment of the head support and the shoulder belts are combined in an easy way.

In accordance with an embodiment, the child seat whereby during height adjustment of the head support (3, 4, 26) a catch (31) moves relative to gaps (33) and whereby tension in the shoulder belt (22) prevents movement of the catch. In this way, the height of the head support cannot change during a collision.

BRIEF DESCRIPTION OF THE DRAWINGS

The invention will be explained in more detail below with reference to an exemplary embodiments by means of a drawing, in which:

FIG. 5 shows a section of the child seat of FIG. 2 whereby the seat frame is in upright position and the head support is in its lowest position, FIG. 6 shows a section of a diagonal bar of the seat support, FIG. 7 shows a perspective view of the child seat similar to the seat shown in FIG. 2 whereby the child seat is fixed on a base that can be fixed in a car, and FIG. 8 shows in interrupted thin lines a perspective view of the child seat similar to the seat as shown in FIG. 2 or 7 and in full lines the course of the car belt that holds the child seat in a fixed position on a back seat of a car.

DETAILED DESCRIPTION OF THE INVENTION

Figure 1:
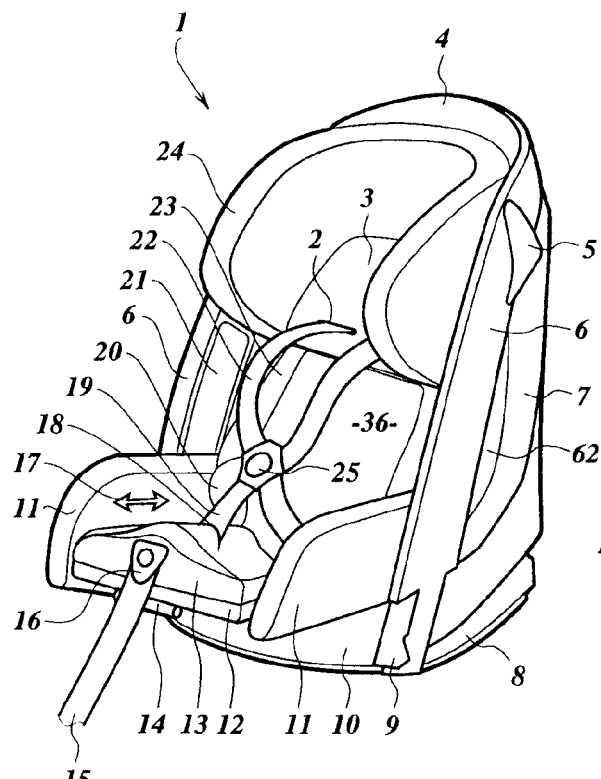
FIG. 1 shows a perspective view of a child seat with a seat support and a seat frame in a reclined position with belts.
Figure 2:
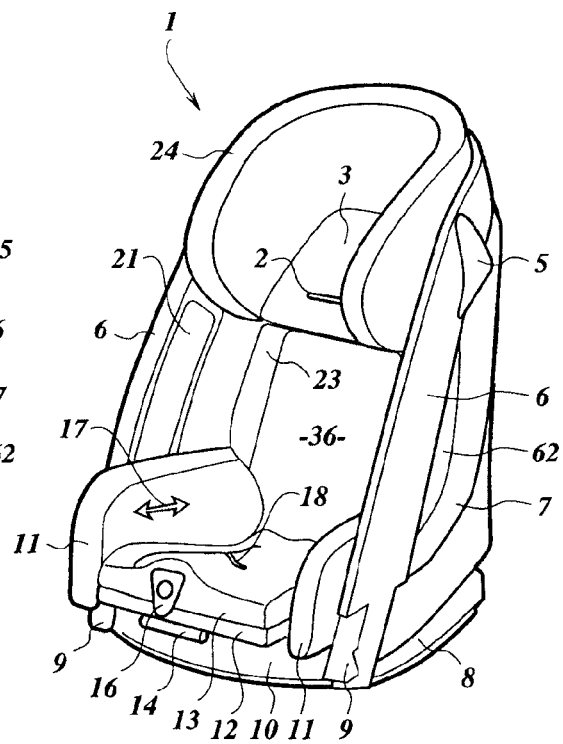
FIG. 2 shows the child seat of FIG. 1 whereby the seat frame is in upright position and without belts.
Figure 3:
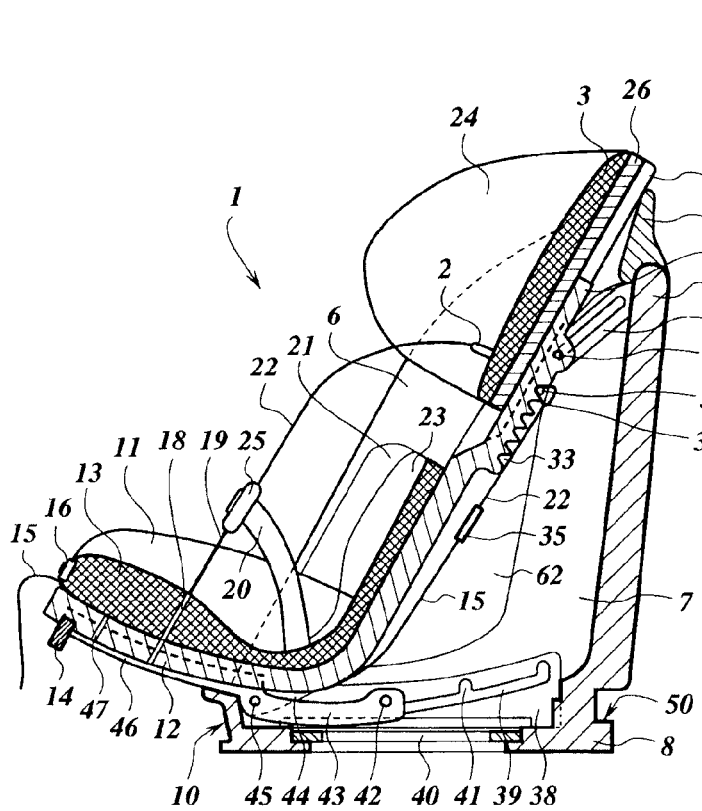
FIG. 3 shows a section of the child seat of FIG. 1 whereby the seat frame is in reclined position and a head support in its highest position.
Figure 4:
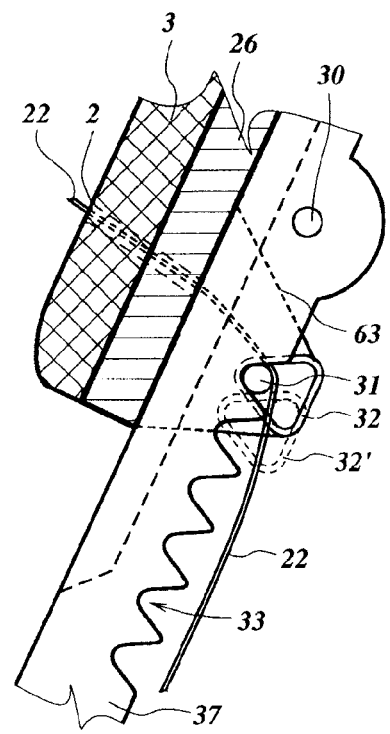
FIG. 4 shows a detail of FIG. 3, in particular the height fixation of the head support.

The FIGS. 1-6 illustrate the various positions of use and parts of a child seat 1. The child seat 1 has a seat support 7 that can be positioned on a seat in a car or on a base 52 (see FIG. 7) that can be mounted on the seat in the car. A seat frame 12 is coupled to the seat support 7 in such a way that the seat frame 12 can make a tilting movement in a direction 17. For this the seat frame 12 has at its bottom coupling ridges 44 that hold a coupling pin 45 that is held in and can slide in slots 39 of a guide plates 38. The guide plates 38 are mounted in the seat support 7 near a support bottom 8. For positioning the coupling pin 45 in the slots 39 the coupling pin 45 is coupled by brackets 43 to a positioning pin 42 which a spring (not shown) pushes in a positioning gap 41 and so positions the coupling pin 45 in the longitudinal direction of the slot 39. A tilt handle 14 moves via tilt arms 46 the brackets 43 and can move the positioning pin 42 free from a positioning gap 41 so that the coupling pin 45 can move in the longitudinal direction of the slot 39 and the seat frame 12 can move in a direction 17.

The seat frame 12 has a seat back 37 and a pin 30 fastened to the top of the seat back 37 and can slide in a bracket 29 that is fastened to the top of a support back 34 that is part of the seat support 7. Movement of the seat frame 12 in the direction 17 causes the coupling pin 45 to slide in the slot 39 and the pin 30 to slide in the bracket 29. In case of a collision of the car in which the child seat 1 is mounted the forward movement of the child is stopped by tension in shoulder belts 22. The shoulder belts 22 will pull the seat back 37 forward and the seat back 37 will pull via the bracket 29 the support back 34 forward. In order to limit the forward movement of the child in such a situation as much as possible the forward movement of the support back 34 must be limited as much as possible. For this the support back 34 is fastened at its top to an upper reinforcement bar 4. Diagonal bars 6 at each side of the seat frame 12 between the reinforcement bar 4 and the support bottom 8 support the reinforcement bar 4 and prevents deformation of the support back 34. The diagonal bar 6 is placed at a distance in front of the lower part of the support back 34 so that there is an opening 62 between the diagonal bar 6 and the seat back 34. Preferably, the diagonal bar 6 is tube shaped with a wall 49 and can be filled with foam filling 48. In order to save space the diagonal bar 6 has a rectangular shape with rounded and/or oval corners. Its height is preferably at least three times its width so that the total width of the child seat 1 hardly in-creases. The diagonal bars 6 are placed as much forward as possible so that they also protect the child from objects that might move during a collision towards the child. Examples are parts of the car or its door at the side of the child seat 1 that move in case of a side impact towards the child seat 1.

The seat frame 12 has at its bottom a seat cushion 13 and each side of the seat cushion 13 a seat side support 11 that limits sideways movement of the child. The seat back 37 has a back cushion 36 for supporting the child and side support cushions 23 limit sideways movement of the child. The diagonal bars 6 limit the sideways movement of the side support 11 and the side support cushion 23. In addition to limiting sideways movements of the child in the child seat 1 the diagonal bars 6 protect the child in case of a side impact. For limiting injuries of a child when it collides against parts of the child seat 1 the various parts and cushions are soft, for instance covered in or made of foam. Also the diagonal bars have a flexible surface 21 that reduces injuries.

A harness positions the child in the seat frame 12. In this embodiment as is usual in the art, the harness has two shoulder belts 22 that are in length adjustable. There are two hip belts 20 coupled to the seat frame 12 and a crotch belt 19 connected to the seat frame 12 through an opening 18 in the seat cushion 13. The belts 19, 20, 22 are coupled to a buckle 25, which can be opened for loosening the belts and removing the child from the seat frame 12 or closed for placing and fixating the child in the seat frame 12. Each shoulder belt 22 runs to the side of the back of the seat frame 12 through a belt opening 2. A coupling plate 35 couples the shoulder belts 22 at the side of the back of the seat back 37. An adjustment belt 15 runs from the coupling plate 35 through an opening 47 to an adjustment knob 16 at the front of the seat frame 12. For adjusting the harness to the length of the child the adjustment knob 16 is used to adjust the length of the adjustment belt 15 and therewith the length of the shoulder belts 22.

For protecting the head of the child in the child seat 1 a head support is attached to the seat frame 12. The head support has a head support shell 26 with a slide groove 27 that can slide over a rail 28 that extends above the seat back 37. The head support shell 26 can be moved upwards or downwards relative to the seat cushion 13 in order to adapt the height of the head support to the length of the child. A head support centre cushion 3 is mounted against the centre of the head support shell 26. The head support centre cushion 3 continuous at the sides as a head support side cushion 24. At the outside, this cushion 24 is supported and protected by the diagonal bar 6. The head support side cushion 24 is relatively thick so that it limits the sideway movements of the child's head.

In order to maintain the shoulder belts 22 at the correct height relative to head and shoulders of the child the shoulder belts 22 are guided through belt openings 2 so that they move upwards and downwards with the head support. The head support is fixed at a certain height with a ratchet that is explained hereafter. The head support shell 26 is provided with ridges 63 in which there is a more or less triangular positioning opening 32 through which a positioning pin 31 is guided. A spring (not shown) pulls the positioning pin 31 towards the head support shell 26 in one of its corners. The seat back 37 is provided with positioning gaps 33, which fit around the positioning pin 31 so that the position of the positioning pin 31 is fixed and therewith the height of the head support shell 26. When the head support shell 26 is moved for instance downwards the positioning opening 32 moves to position 32', shown with interrupted lines in FIG. 4, and lifts the positioning pin 31 out of the positioning gap 33 so that the head support can move further downwards where after the positioning pin 31 is pulled by the spring in the next positioning gap 33. In this way, the height of the head support shell 26 can be adapted easily. As the shoulder belt 22 is looped around the positioning pin 31 tension in the shoulder belt 22 prevents lifting the positioning pin 31 out of the positioning gap 33, so that in case of a collision the head support shell 26 maintains its height and maintains the protection of the child.

The child seat 1 can be fastened in a car by using the three-point belt of the car as illustrated in FIG. 8. For this the support bottom 8 has at its front a hip belt guide 10 for supporting a hip belt loop 61. A hip belt clamp 9 positions the hip belt loop 61 relative to the child seat 1 and on one side of the child seat the hip belt ends at a hip belt fastener 60 and at the other side of the child seat the hip belt ends at a buckle 55. At the top of the seat support 7 there is on each side a shoulder belt clamp 5. The shoulder belt clamp 5 guides the shoulder belt of the car in a shoulder belt loop 57 around the upper reinforcement bar 4 and from the shoulder belt clamp 5 either upwards as a shoulder belt upper part 58 to a shoulder belt fastener 59 or downwards as a shoulder belt lower part 56 to the buckle 55.

As shown in FIG. 7 the base 52 can fasten the child seat 1 in the car. The base 52 has hooks 51 that connect to braces mounted in the car. The base 52 can be carried using a handle 53. For connecting the child seat 1 to the base 52 the support bottom 8 has a flange 40 around which hooks mounted in the base 52 (not shown) can grip when a handle 54 is activated and so pull the child seat 1 on the base 52. For further preventing unwanted forward tilting of the child seat 1 relative to the base 52 the base 52 can have a hook (not shown) that grips the support bottom 8 a ridge 50.

What is claimed is:

1. Child seat for transporting a child in a car comprising a seat support with a support bottom with a forward end and a support back with an upper end which extends above the support bottom, a seat frame with a seat back that has harness belts for holding the child against the seat frame and seat back, and slides between the seat support and the seat frame for coupling the seat frame in adjustable tilt positions to the seat support, which slides comprise an upper slide for connecting an upper or shoulder part of the seat frame to the upper end of the support back and a lower slide for connecting a lower or bottom part of the seat frame to the forward end of the support bottom characterized in that on both sides of the seat frame the seat support comprises a diagonal bar in front of the seat back and immovably connected to the forward end of the support bottom and to the upper end of the support back above or at the height of the upper slide.

2. Child seat in accordance with claim 1 wherein the diagonal bar has a tube shaped section that is rectangular with rounded or elliptical corners whereby the height is at least three times the width.

3. Child seat in accordance with claim 1 wherein the tilt positions range from an upright sitting position to a recline position and whereby the diagonal bars in front of the seat back maintain their position in all tilt positions.

4. Child seat in accordance with claim 1 wherein the seat frame has between the diagonal bars a height adjustable head support.

5. Child seat in accordance with claim 4 wherein the harness belts comprise a shoulder belt that is guided through an opening in the height adjustable head support.

6. Child seat in accordance with claim 5 wherein during height adjustment of the head support a catch moves relative to gaps and wherein tension in the shoulder belt prevents movement of the catch.

7. Child seat in accordance with claim 1 wherein the support bottom has first attachment means for removably connecting the support bottom to a base fastened on the seat of the car.

8. Child seat in accordance with claim 1 wherein the seat support has second attachment means for guiding and attaching a shoulder belt and a hip belt of the car to respectively the support back and the support bottom.

* * * * *